(12) United States Patent
Neville et al.

(10) Patent No.: US 9,137,138 B2
(45) Date of Patent: Sep. 15, 2015

(54) METHOD AND SYSTEM OF CONTROLLING SPAM

(75) Inventors: Stephen W. Neville, Victoria (CA); Michael Horie, Victoria (CA)

(73) Assignees: Stephen W. Neville, Victoria, BC (CA); Michael Horie, Victoria, BC (CA)

(*) Notice: Subject to any disclaimer, the term of this patent is extended or adjusted under 35 U.S.C. 154(b) by 97 days.

(21) Appl. No.: 12/325,116

(22) Filed: Nov. 28, 2008

(65) Prior Publication Data
US 2010/0138539 A1 Jun. 3, 2010

(51) Int. Cl.
*H04L 12/701* (2013.01)
*H04L 12/715* (2013.01)
*H04L 12/725* (2013.01)
*H04L 29/06* (2006.01)

(52) U.S. Cl.
CPC ............... *H04L 45/00* (2013.01); *H04L 45/04* (2013.01); *H04L 45/308* (2013.01); *H04L 63/12* (2013.01); *H04L 2463/146* (2013.01)

(58) Field of Classification Search
CPC ... H04L 2463/146; H04L 45/00; H04L 45/04; H04L 45/308; H04L 63/12
USPC .................................................. 709/226, 246
See application file for complete search history.

(56) References Cited

U.S. PATENT DOCUMENTS

| 2001/0034839 A1* | 10/2001 | Karjoth et al. | 713/190 |
| 2003/0065812 A1* | 4/2003 | Beier et al. | 709/236 |
| 2003/0088662 A1* | 5/2003 | Okamoto | 709/223 |
| 2006/0156401 A1* | 7/2006 | Newstadt et al. | 726/22 |
| 2007/0053510 A1* | 3/2007 | Rosati et al. | 380/30 |
| 2007/0064944 A1* | 3/2007 | Furuya et al. | 380/259 |
| 2008/0016159 A1* | 1/2008 | Cai | 709/206 |
| 2008/0098107 A1* | 4/2008 | Jones et al. | 709/224 |
| 2008/0134332 A1* | 6/2008 | Keohane et al. | 726/23 |
| 2009/0252159 A1* | 10/2009 | Lawson et al. | 370/352 |
| 2010/0138539 A1* | 6/2010 | Neville et al. | 709/226 |

OTHER PUBLICATIONS

Horie, Michael, and Stephen W. Neville. "Addressing Spam at the Systems-level through a Peered Overlay Network-Based Approach." Novel Algorithms and Techniques in Telecommunications, Automation and Industrial Electronics (2008): 449-453.*

* cited by examiner

*Primary Examiner* — Michael C Lai
(74) *Attorney, Agent, or Firm* — Fasken Martineau DuMoulin LLP

(57) ABSTRACT

A method for a first network to receive a packet from a second network is provided, including a router at the first network receiving the packet from the second network, the packet addressed to a client reachable through the first network; the router inspecting the packet for a nonrepudiable marking provided by the second network; if the nonrepudiable marking is present and matches the packet, adding an indicator pointing to the second network in the packet; adding a second nonrepudiable marking to the packet, and transmitting the packet to a destination; and otherwise, dropping the packet.

9 Claims, 3 Drawing Sheets

| Label Pairs =2 | B's Signature | A's Key | A's Signature | E-mail Signature | Original IP Packet |

| Label Pairs =3 | D's Signature | B's Key | B's Signature | A's Key | A's Signature | E-mail Signature | Original IP Packet |

METHOD AND SYSTEM OF CONTROLLING SPAM

FIELD OF THE INVENTION

This invention relates to a method and system for marking a network packet for the purpose of determining the transmission participants at a later point in time.

BACKGROUND OF THE INVENTION

Transmitting messages over networks (e.g., in the form of e-mails or instant messages) has become a highly-popular means of communication. Yet it remains difficult to trace such messages with certainty (i.e., to be able to state with a high level of confidence that a particular part of the network, such as a router, participated in delivering the message to its destination). The need to trace with certainty, however, is important in the light of cybercrime, which uses networked message communication to transmit malware and other threats. Without this ability, it is difficult to establish the offender and to take appropriate relief action. One example is spam. Spam continues to consume vast amounts of network and server resources worldwide, with some studies suggesting rates over 80% of all monthly emails. Another study suggests that an estimated 183 billion emails per day are propagated through the Internet just to be, ideally, deleted upon receipt. While wide-scale deployment of advanced anti-spam technologies has significantly reduced the impact of spam for the end-user, the issue remains that large amounts of network resources are still consumed to transmit large volumes of spam. For organizations receiving spam, this translates into high costs due to factors such as:

1. Paying an upstream service provider for the network bandwidth wasted by spam;
2. Keeping spam defenses up to date, requiring the purchase of up-to-date hardware and software, as well as training of personnel;
3. False positives (i.e., legitimate messages that were mistaken as spam) resulting in lost business; and
4. False negatives (i.e., spam messages that were mistaken as legitimate messages) which, in the best case, cause the recipient to waste time to erase the messages and in the worst case expose the recipient to malware or fraud.

In the prior art, there are a number of methods that can be used to trace the path that a packet took through a network. Most of the methods are designed for determining the source of a denial of service (DoS) attack.

One approach is to let routers (a network device capable of forwarding packets from one network to another) mark packets they transmit with a probability p. This allows DoS victims to determine which routers are involved by checking for these marks.

Another approach is to ask routers to copy packets they receive and encapsulate them in separate trace packets that are then sent to their final destination using Internet Control Message Protocol (ICMP). To avoid flooding the network, routers only send these trace packets with a very low probability.

A third approach is to flood upstream routers selectively and see how this affects the attack packets the client receives. If there is a reduction, the router that was just flooded is likely a participant in the attack.

A fourth approach is to take suspicious flows and route them over a special analysis network.

The problem with adapting these approaches to non-DoS scenarios, such as spam, is that while in a DoS situation a large flood of packets is sent to a single victim, in spam there are many victims, each of which receive, at most, only a few copies of a given spam message. Thus chances are high that a given spam message will be too short to generate sufficient information to trace to the original sender of the spam message. Furthermore, the spam marking technique can be subverted by a malicious router by either not marking a packet, or using the markings of another router.

An alternative is to ask routers to log packets they receive. Victims of an attack are then theoretically able to trace back by querying various routers' log databases. Adapting this approach to non-DoS domains, such as spam, is possible, but given that only very little information is retained in these databases in practice, the possibility of false positives exists. Also, subverted routers can deny that they were responsible for transmitting a given spam packet. Finally, a network is very unlikely to allow other networks to probe its router logs, to determine where an attack is coming from; but without this co-operation, tracing the message path will not succeed.

E-Mail

Outside of DoS, some traceback work has been done in the area of e-mail transmissions. For example, SpamCop™ uses mail headers to make an educated guess about the source of a spam message and allows complainants to send an automated message to the originating ISP. SpamCop™ also publishes a blacklist of spamming ISPs as an enforcement mechanism. However, the fact that e-mail headers can be forged means that SpamCop™ cannot always positively identify the sender.

Domain Keys Identified Mail (DKIM) goes a step further by requiring the originating mail servers to sign every outgoing mail message. This allows positive identification of the source. While there is no direct defense against spammers who authenticate their spam, DKIM allows positive traceback to the spammer's mail server, exposing it to blacklist inclusion. DKIM is often promoted in conjunction with the Sender Policy Framework (SPF), which requires domains to publish the IP addresses of their mail servers. If a message was not delivered by one of these mail servers, it could indicate a forged return path or a bot, which is indicative of spam.

Armorpost™ also requires all senders to authenticate themselves. However, Armorpost™ is stricter than DKIM in the sense that in order to send a message to a client protected by this system, the sender must join Armorpost™ as well; otherwise, the message will not be delivered. Given the wide range of internet users, such a system is likely going to be too complicated or too intrusive for many netizens, resulting in messages not being transmitted to the intended recipient. Furthermore, Armorpost™ requires the setup of an extensive, hierarchical certificate architecture in order for previously unintroduced Armorpost™ agents to trust each other.

Digital Postmarks provide another means to trace offending ISPs. Using this protocol, the first border router along a packet's path inserts a postmark based on the router's IP address, allowing the recipient to narrow down the source of the packet. However, the path taken once inside the network cannot be traced with this method.

A problem with traceback schemes in general is that there is no effective enforcement once an offender has been identified. This is especially the case with large botnets that are now responsible for sending most of the spam. Simply blacklisting a machine that was responsible for sending spam is not effective, since a spammer can easily subvert another vulnerable machine, often in another network, and continue to send spam from there. Blacklisting an entire domain from which large volumes of spam were sent is also not an attractive option, since this will also filter out legitimate e-mail messages, especially as larger domains from which spam messages are sent are unlikely to be blacklisted. Other alternatives, such as lawsuits against offending ISPs, may prove fruitless if the ISP is located in a jurisdiction that has permissive spam legislation. A recent study by the Committee on Critical Information Infrastructure Protection and the Law (National Academy of Engineering) describes some of the challenges posed by international boundaries. First, there is the challenge to secure evidence quickly. Informing a party in a foreign jurisdiction that a violation is, or has recently, taken place, and then waiting for a response, risks that the evidence needed at the source will be lost. Second, there is the challenge of prosecuting the parties responsible. This requires international treaties and changes in the laws of the countries involved, which is a tedious process fraught with difficulties. Furthermore, any nation that does not sign on to such a treaty is likely to become a haven for spammers and other dubious netizens. Thus an effective treaty on tracing and stopping spammers would have to be effective globally, which is unlikely to occur given the current global political climate.

Other Art

Much of the academic literature on spam prevention has focused on detecting spam at the recipient's end, using scanning techniques such as naive Bayesian algorithms, support vector machines, memory-based classifiers, and boosting trees. Commercial products also tend to focus on detecting spam at the recipient's end, often combining this with complementary techniques such as blacklisting IPs of machines that have sent spam in the past.

For example, Cisco™'s Ironport Antispam™ evaluates messages based on: the reputation of the sender, considering factors such as the country of origin and recent suspicious activity; the reputation of included URL links, based on factors such as the age of the domain registration; the structure of the message, such as missing or suspicious SMTP headers; and the actual contents of the message. Ironport™ also runs an operations center that generates signatures for spam messages that make it past four checks corresponding to the above factors.

Cloudmark™, which grew out of the Vipul's Razor™ open-source project, takes a different approach by relying on a large user community to flag spam. In essence, the program computes a fingerprint for every incoming message and compares this to existing spam fingerprints in a catalogue server. If there is no match, the message is delivered to the recipient's mailbox. In the case where the recipient feels that the message is spam, the program is directed to nominate the message as spam. If a sufficient number of users have designated the same message as spam, it is forwarded for inclusion in the catalogue server database.

The problem with client-side detection in general is that network bandwidth has already been consumed to transmit the message. Thus even if the message is ultimately discarded, the recipient will nonetheless have to pay for the cost of transmission, detection, and elimination. Furthermore, history has shown that client-side scanning for spam is easily subverted, by varying the spelling of certain words, adding large amounts of unrelated text, using graphics, and other means. For client-side scanning to become less vulnerable to subversion, one must first solve the open artificial intelligence problem of building an automated system that correctly understands context within free-form text and arbitrary images.

In addition to scanning and trace-back techniques, there have been proposals that would require significant changes to the way the Internet operates. For example, charging small amounts of money for every mail message, or requiring the originating mail server to complete certain computations, have been suggested as ways to make it economically unfeasible to transmit spam. Another idea involves requiring every message to be labeled according to a universal labeling scheme.

The problem with these large scale change techniques is that they don't work unless a sufficiently large number of participants opt in at around the same time. Looking at other change based protocols, such as IPv6, this is proving rather difficult to achieve.

SUMMARY OF THE INVENTION

In one aspect of the invention there is provided method to trace, with a high level of confidence, the path that the messages or parts thereof took through the network. The method of tracing is based upon the marking (an indication or record of a point on the path taken) introduced on the messages or parts thereof as they travel through the network. Unlike other methods, all messages that are successfully delivered are traceable even if other participating autonomous systems are not trusted. As a result, all senders and intermediaries are not able to deny their involvement in the transmission of the message. The infrastructure involved is simple, peer-based, and is invisible to senders and recipients of messages, unless tracing is required. In another aspect of the invention there is provided a method that allows an opt-in process in which some benefits accrue to early adopters, and positive feedback occurs as adoption rates grow, following the successful adoption models of other Internet technologies such as MP3. As the user community grows, Metcalfe's law begins to apply, attracting more users in a positive feedback cycle, thereby allowing the change to both take root and unfold.

In another aspect of the invention there is provided a model based on partnerships with existing network peers. As a result, jurisdictional concerns are significantly reduced. In another aspect of the invention there is provided a model that allows an opt-in process in which some benefits accrue to early adopters, and positive feedback occurs as adoption rates grow, following the successful change adoption models of other Internet technologies such as MP3. As the user community grows, Metcalfe's law begins to apply, attracting more users in a positive feedback cycle, thereby allowing the sea change to both take root and unfold.

A method for a first network to receive a packet from a second network is provided, including a router at the first network receiving the packet from the second network, the packet addressed to a client reachable through the first network; the router inspecting the packet for a nonrepudiable marking provided by the second network; if the nonrepudiable marking is present and matches the packet, adding an indicator pointing to the second network in the packet; adding a second nonrepudiable marking to the packet, and transmitting the packet to a destination; and otherwise, dropping the packet.

The nonrepudiable markings may be based on digital certificates. A lookup field may be used to determine the path of the packet. The router may have a cryptographic processor. A plurality of packets may be received from the second network, and if the packets contain spam exceeding a predetermined limit, the second network compensates the first network. The packet may contain a plurality of signatures from a plurality of networks to allow the router to determine the path of the packet.

A system for reducing spam messages within a plurality of networks is provided, including: a first network within the plurality of networks, the first network having entered into a peer-to-peer quality of service agreement with at least a second network within the plurality of networks; the agreement providing a predetermined limit of an amount of spam messages sent from the second network; the first network passing messages received from the second network with a verified digital signature of the second network to clients of the first network; wherein if the messages from the second network sent to clients of the first network exceed the predetermine limit on the users of the amount of spam, the second network compensates the first network.

A router within said first network may have a cryptographic processor. The messages may include a lookup field to determine the path of the message. At least some of the messages may include a plurality of digital signatures from networks within the plurality of networks.

A first network for receiving and transmitting packets to a plurality of other networks is provided, wherein a first selection of networks with the plurality of networks has entered into a peer-to-peer quality of service agreement with the first network to control the transmission of spam, and a second selection of networks within the plurality of networks have not entered into a peer-to-peer quality of service agreement with the first network to control spam; including: a computer within the first network, the computer configured to receive and transmit packets received from the plurality of networks, and to transmit packets generated within the first network, and to transmit packets to a client of the first network, when the packet is addressed to the client; wherein when the computer receives a packet from a network within the first selection of networks, and the network within the first selection of networks has digitally signed the packet, the computer digitally signs the packet and transmits the packet to a destination; and wherein when the computer receives a packet from a network within the second selection of networks, the computer treats the packet as potential spam, and if the computer transmits the message, the computer does not digitally sign the packet.

The computer may have a cryptographic processor. The packet from the network within the first selection of networks may have a plurality of digital signatures from a plurality of networks within the first selection of networks. The packet from the network within the first selection of networks may have a lookup field corresponding to a lookup table accessible by the computer. A plurality of packets may be received from the network within the first selection of networks, and if the plurality of packets contain spam exceeding a predetermined limit, the network within the first selection of networks compensates the first network.

DETAILED DESCRIPTION OF THE INVENTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention is to mark packets belonging to a message as they traverse a network. The granularity of the marking can vary. For example, the marking can be done on a per-router basis, or as another example, it can be done on a per-autonomous system (network) basis. The marking can be done in such a way that the participant cannot later deny responsibility in transmitting the message, or parts thereof. Examples of marking include digital signatures, confirmable using a key.

Another aspect of the invention is to require immediate peers to take responsibility for the packets they transmit.

To illustrate the above aspects of the invention, spam e-mail will be used as an example. Note that these aspects of the invention can be used independently, however, when used together, an effective synergy forms.

Administrators of autonomous systems can create a low-spam network overlay over existing networks, enforced by peer-to-peer quality-of-service (QoS) agreements. Each participant in the network overlay must agree to take active measures to prevent machines in their domain from injecting spam into this overlay, and each participant accepts responsibility in case the measures taken to prevent spam are insufficient. In return, access is gained to an overlay network in which all other players have agreed to a similar level of responsibility, enabling a reduction of resource demands due to decreased spam volumes. The choice of measures is left to each participant's discretion; it is expressly not enforced by the protocol. Instead, the protocol is results based. The enacted measures must be sufficient to meet the participants' peer-to-peer Quality of Service (QoS) agreements. Failure to take sufficient active measures would be a violation of these agreements, and depending on the agreement, could result in reduced or denied access to the low-spam network overlay and/or compensatory penalties, which may be in services, goods, or financial.

The QoS agreements may be between any two networks, or may be a document expressing terms agreed to by several networks. A key component of the QoS Agreement is that it provides the parties agreeing to limit the spam sent by each party, and each party agrees to follow the protocol allowing packets sent from or through their network to be traced. The penalty for failing to meet the spam limits should also be expressed in the QoS agreement. QoS agreements may also have additional provisions, terms or requirements on other subject matter.

Figures 1, 2, 3:
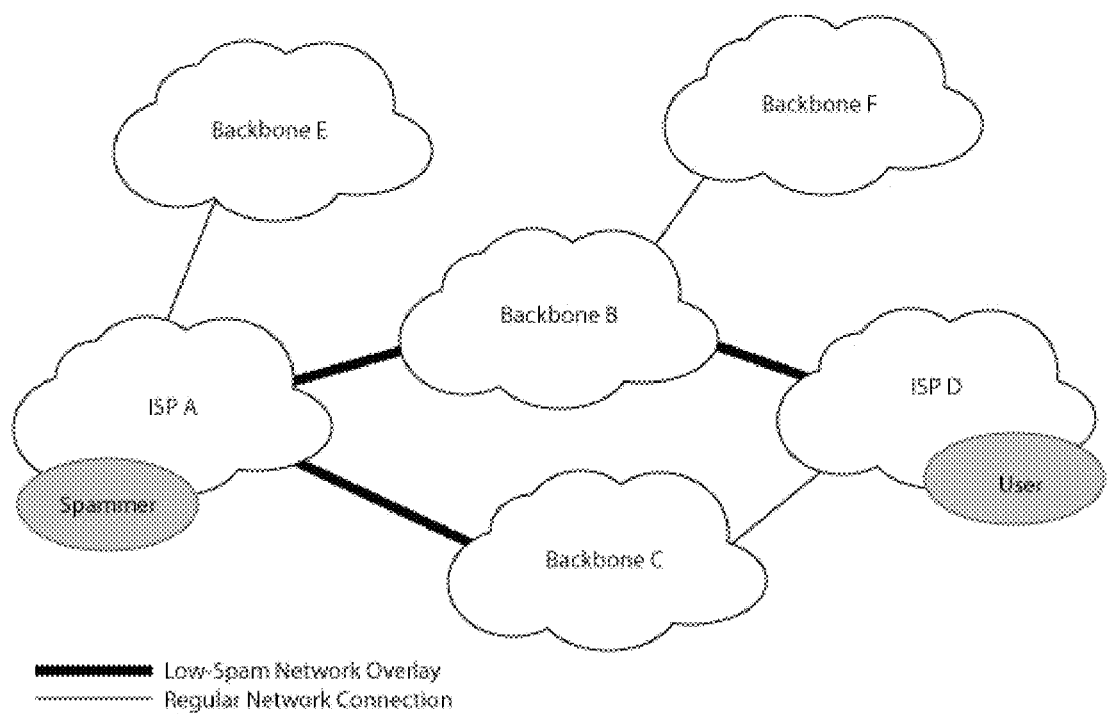
FIG. 1 illustrates sample connections among six networks, according to the invention, including normal network connections and low-spam network overlay connections.
FIG. 2 illustrates an embodiment of an overall packet structure according to the invention, as it leaves ISP A's mail server.
FIG. 3 illustrates the overall packet structure according to the invention, as it enters Backbone B.

A sample illustration of network connections is shown in FIG. 1. Two of those networks, A and D, are internet service providers (ISPs) and four of them, B, C, E and F, are backbones. The thin lines represent normal network connections. Thick lines represent low-spam network overlay connections. For example, ISP A and Backbone B have a low-spam network overlay connection, requiring both A and B to inject messages into this overlay according to the terms of their QoS agreement. FIG. 1 furthermore illustrates a spammer connected to ISP A attempting to send a message to a user at a client connected to ISP D.

In FIG. 1 there are six connections between the autonomous networks. Three of these connections are governed by low-spam network overlay agreements, the other three are not. Note that QoS agreements need not be the same across the networks. Thus the QoS agreement governing the connection between ISP A and Backbone B may be quite different from the QoS agreement between ISP A and Backbone C. What is important, though, is that participants in these agreements be able to determine whether or not a particular spam message traversed their networks. For example, if a spammer uses ISP A to inject a spam message that is then routed via Backbone B to ISP D, it must be possible to retrace this route. Specifically, assuming the user has just received this spam message and reports it to their ISP, ISP D, that ISP must be able to determine that the spam was sent via backbone B. In turn, Backbone B must be able to verify that it indeed routed this message, and that the previous network was ISP A. Finally, ISP A must be able to verify that it indeed was the origin of the spam message.

It is important to note that ISP D is not required to go after the originating ISP A directly. Instead, ISP D passes the information regarding spam back up to its peer, backbone B. As per the QoS agreement between D and B, B must now take the next step. If B fails to act, the penalty terms of the agreement between B and D come into play and D gains the agreed-upon compensation.

When B passes the complaint to ISP A with which it has another peer-to-peer QoS agreement, A must address D's identified spam issues or face the penalties under its agreement with B. If A addresses the problem as required, then B meets its terms with D and the problem is solved. If not then B can choose to either accept compensation from A which can be used to mitigate the cost of the compensation due to D, or in the extreme case, choose to sever ISP A from the overlay, and in that manner address D's concern.

Of course, messages may be routed in part or whole over connections that are not governed by QoS agreements. For example, A may send a message to D via C. When the message is passed from A to C, the message will be under the low-spam agreement. However, C, noticing that there is no QoS agreement with D, then proceeds to transmit the message as a normal e-mail message. Even if the message is spam, D will not be able to complain to C, since no QoS agreement is in place. Thus there is an incentive for D to make sure that all its connections fall under a QoS agreement.

The reverse scenario is a little different. For instance, assume a spam message originates with D and is transmitted to A via C. Because there is no QoS agreement between D and C, the message will be routed normally. Even though there is a QoS agreement between C and A, the fact that the message came over a normal connection prevails, so C will deliver the message to A via a normal connection, not the low-spam overlay. In other words, whether a message is sent normally or over the low-spam network overlay depends on whether or not the entire path is covered by suitable QoS agreements.

It is clearly preferable that all networks have to participate in QoS agreements in order to achieve a reduction in spam. Obviously, a single network implementing this protocol will not see any benefit; but for groups of networks which share much traffic, a benefit should be realizable even if only the members of this group participate in such agreements. For example, if A, B, C, and D are in a relationship where most non-spam e-mail traffic stays within this group, a benefit from a low-spam agreement is achievable even if E and F do not participate.

Another question relates to networks such as E and F which have not signed onto QoS agreements. It is likely that, as spammers are pursued more aggressively by member networks, non-signatories will see an influx of spammers. As the number of member networks grows, members should be able to take stronger measures against messages arriving via normal connections, including the reduction of bandwidth and more aggressive filtering.

By relying on the peer-to-peer aspect, the problem of dealing with ISPs in different jurisdictions can be reduced significantly. The penalties that peers can place on each other are based on their QoS agreement, into which they freely entered. Rather than attempting to resolve issues at the nation-to-nation level, network peers can act within timeframes specified by their QoS agreements, which may be immediate, if authorized in the terms of the QoS agreement. Such peered QoS agreements are innately jurisdictionally enforceable since both parties agree a priori whose laws apply (i.e., the QoS agreement follows the standard model for cross-border business agreements). Furthermore, networks are not required to enter into contracts with all other member networks, but only with networks to which they are physically connected. Since such connections are already subject to contract, adding a low-spam requirement to convert the existing agreement to a QoS agreement is not difficult.

Implementation of the Sender to Recipient Path

A nonrepudiation tracing and peer-to-peer agreement protocol can be implemented in many different ways. Two sample e-mail implementations to allowing tracing of email messages follow.

To implement a low-spam network overlay, it must be possible to determine which networks (i.e., autonomous systems) an e-mail traversed before reaching its destination. One way to accomplish this is to require that the originating mail server sign every outgoing message that is to be transmitted over the low-spam overlay. Since e-mails are subject to fragmentation while in transit, this actually involves signing every IP packet, as illustrated in FIG. 2. As seen in FIG. 2, the label pair field indicates how many label pairs are present. A label field normally consists of a signature and a lookup key. (The first instance is an exception, since no lookup key is required.) A's signature is the result of signing over the e-mail signature and the original IP packet. The e-mail signature is the result of signing over the original e-mail message. The original IP packet indicates an IP packet fragment containing the original message.

Here, the e-mail signature refers to the signature derived when signing the e-mail in its entirety. A's signature refers to the signature derived when signing the e-mail signature and the original IP packet. The label pairs refer to the number of networks that have added a signature pair.

The next network B along the low-spam path of the e-mail must provide special treatment for IP packets that have a TCP payload headed to a port designated for the low spam network overlay, in this example, port 25. Specifically, the ingress router of B must check that ISP A's signature matches the incoming packet. If it does not match, the packet is discarded. If it does match, the number of label pairs is incremented by one. Then the IP address of the neighboring router from which the packet arrived, and a placeholder for B's signature is inserted, as illustrated in FIG. 3. The label pair field has been incremented by one. The leftmost signature field has been created but not yet given a valid signature. The lookup field is set to the IP address of the router in ISP A that injected the packet into backbone B. The remaining fields are the same as described above in reference to FIG. 2.

Figures 4, 5, 6:
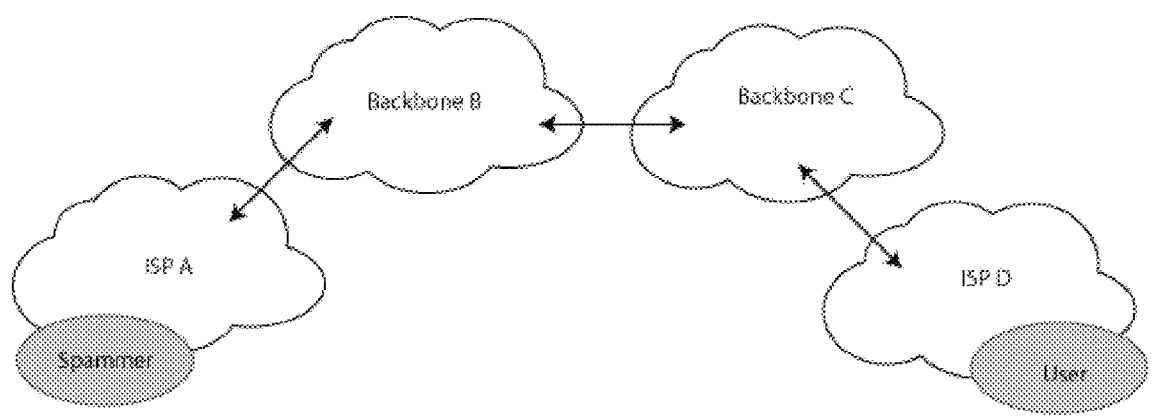
FIG. 4 illustrates the overall packet structure according to the invention, as it leaves Backbone B.
FIG. 5 illustrates the overall packet structure according to the invention, just before ISP D hands off the packet to the client.
FIG. 6 illustrates sample connections between four networks (two ISPs and two backbones) that trust each other.

The IP packet is then routed over B's low-spam overlay. The egress router of B inspects the packet. If the adjacent network is not part of the low-spam overlay, the original IP packet is restored. This removes the ability of downstream networks to lodge a complaint based on the protocol; however, as they did not sign an appropriate QoS agreement, this is a natural consequence. If the neighboring network did take part in a QoS agreement, the backbone replaces A's egress router IP with a lookup key that is unique to B. This lookup key, as well as the packet received from A, are then signed by B with its private key, as illustrated in FIG. 4. The lookup field now contains an identifier (A's key), meaningful to backbone B, tying the packet back to ISP A. The leftmost signature is obtained by having B sign over all the fields to the right of B's signature field. The remaining fields are the same as described above in reference to FIG. 2.

The next network proceeds in a similar manner. Just before reaching the recipient mail transfer agent (MTA), the IP address is replaced with a lookup key, and the packet is signed, as shown in FIG. 5. The label pair field has been incremented by one again. D's signature is obtained by having D sign over all the fields to the right of D's signature. B's key is a lookup key (B's key), meaningful to D, that ties the packet back to B. The remaining fields are as described above in reference to FIG. 3.

The machine hosting the MTA must store the packets associated with the current SMTP connection against a unique lookup key, and inject this key as an SMTP header into the mail message. When users report a message as spam, the key will allow the MTA to retrieve the original packets, which in turn will allow the messages' entire path to be traced back.

Before handing off the mail to the user, the MTA must ensure that the original e-mail signature matches the reassembled message. If not, the message was tampered with, and should be dropped.

When a spam complaint reaches D, D must first check the e-mail against A's e-mail signature and the spam trace packets against D's signature. Should either one of them fail, the e-mail message was tampered with, and is rejected. The tampering party's machine can then be identified and appropriate follow-up actions taken.

If the signature checks pass, D uses the lookup key to determine that the previous step in the upstream chain was B. Depending on the QoS agreement, the complaint is either directly forwarded to B, or only after a certain threshold of complaints against B have accumulated. Before forwarding the complaint to B, D's signature and lookup key are removed. Similarly, B checks the e-mail signature against the e-mail, and the spam packets against B's signature. Upon successful match, B can now lodge a complaint with A.

Given that especially backbones have to handle a high rate of traffic, the above protocol should be used in conjunction with a cryptographic processor. In the context of this invention, a cryptographic processor is a processor that can generate and verify signatures at a high speed.

A Streamlined Version

The protocol described previously assumes that backbone service providers do not trust each other. If this assumption can be relaxed, a significant reduction in overhead can be achieved. Specifically, the primary cost is incurred by the per-network signature, which allows a network N" to prove immediately that the previous network was N'. If this proof is not needed, the signature fields can be collapsed into a single signature field. A secondary cost is incurred by the per-network lookup key. Again, in case of increased trust, these keys can be collapsed into a single field.

Figure 7:
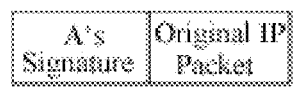
FIG. 7 illustrates a packet, according to an embodiment of the invention, as it leaves ISP A's mail server.

Consider the network illustrated in FIG. 6 in which there are connections between four networks (two ISPs and two backbones) that trust each other. Furthermore, a spammer connected to A is attempting to send a message to a user with a client connected to ISP D. Under the streamlined protocol, the originator must sign the overall message and append this signature to the original message. The originating ISP A must then sign this signature and add the result to the signature field. The label pair is no longer required. The packet structure is illustrated in FIG. 7. A's signature is obtained by signing over the original e-mail signature. The original IP packet indicates an IP packet fragment containing the original message. If A is not trusted by B, A also has to sign over the entire packet and add this to the packet as seen in FIG. 7.

Figure 8:
FIG. 8 illustrates the packet as it leaves backbone B.
Figure 9:
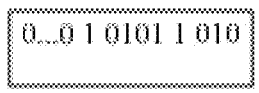
FIG. 9 illustrates an embodiment of a structure of the lookup field according to the invention, for a streamlined protocol.

The next network along the path, network B, verifies the packet signature and adds a lookup field as before, as shown in FIG. 8. In this case the lookup field has been modified so that B can tie the packet back to A. The compound signature field is obtained by having sign B over A's signature. However, the structure of the lookup field is different. Using, for example, 32 bits for the lookup key, allows a network to change incoming network identifiers periodically. This allows a network to hide the previous network to some degree. However, where this is not required, a network only needs to use the minimum number of bits required to identify each adjacent network. For example, if network B is connected to five other networks, only three bits are required to generate a unique local identifier for each of those networks. These three bits are added to the very right of the lookup field. The next network along the path, network C, must also add a unique local identifier for B to the lookup field. If C is connected to ten other networks, C would require four bits. Assuming B uses the code 010 to identify A, and C uses the code 0101 to identify B, the lookup field would appear as shown in FIG. 9 when leaving network C. Note that marker bits were inserted between entries, to ensure that a network knows where to add its identifier code.

After adding the lookup key, B goes on to encode the signature field with its private key, and adds the result to the signature field. C similarly encodes the signature field with its private key. Thus the signature field would look as follows when leaving network C:

{{{hash(message)
OriginatorPrivate}APrivate}BPrivate}CPrivate}

If the receiving ISP D is not trusted by C, C would also sign over the entire packet, as it leaves C's network.

To trace the packet back, D has to present the original packet as it was received from C. C now has to strip off its lookup key for B, as well as decrypt the signature field with its public key. This results in the packet as it was received from B. B now has to strip off its lookup key and decrypts the signature field with its public key, resulting in the packet as it was received from A.

An application-level protocol can be used to facilitate the return of the spam packets, and to collect routing information as the packets are sent back over the internet. If the message was correctly routed back, the spam e-mail's signature is positively verifiable by network B. If the message was not routed back correctly, or if one of the intermediate networks used a wrong key, this positive verification will not be possible. Furthermore, an intermediate network could maliciously use a wrong key. Thus, in case of a lack of trust, the previous protocol is preferable.

Note that MTAs may store received packets and markings, possibly for a limited time, to allow a subsequent trace to be launched.

The above system, while described in an email embodiment, is also applicable in other point-to-point message transmission systems, as well as broadcast and multicast transmission systems Certain implementations of the invention comprise computer processors which execute software instructions which cause the processors to perform a method of the invention. For example, one or more processors in a computer system connected to a network may implement the methods described herein by executing software instructions in a program memory accessible to the processors. Portions of the invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links. The instructions may optionally be compressed and/or encoded.

Where a component (e.g. a server, module, assembly, application, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for a first network to receive a packet from a second network, comprising:
   a) a router at the first network receiving the packet from the second network; the packet addressed to a client reachable through the first network wherein the packet is transmitted over a route wherein there is an agreed peer-to-peer low-spam overlay between at least one of i) the first network and the second network and ii) adjacent networks between the first network and the second network through which the packet is transmitted;
   b) the router recognizing if the packet is via the route and inspecting a designated digital signature field of the packet for a digital signature provided by the second network ("source digital signature");
   c) if the digital signature is present and is verified by the router, adding a lookup key pointing to the second network in the packet; adding a "recipient" digital signature to the packet, the source digital signature and the recipient digital signature forming a signature pair, and transmitting the packet to the client; and
   d) otherwise, if the source digital signature is not present and verified by the router, thereby confirming receipt of packet over a low-spam overlay, dropping the packet, and wherein there are a plurality of networks between the second network and the first network, each network being party to at least one peer-to-peer low-spam overlay and wherein each network adds a digital signature pair if steps b) and c), in respect to respective routers at each network, above are satisfactorily completed such that the route taken by the packet can be traced back in linear time;

and wherein
   i) a router at at least one intermediate network (intermediate router) receives the packet from the second network;
   ii) the intermediate router recognizing if the packet is via the route and inspecting a designated digital signature field of the packet for a digital signature provided by the second network ("source digital signature"); and
   iii) if the digital signature is present and is verified by the router, adding a lookup key pointing to the second network in the packet; adding an "intermediate" digital signature to the packet, the source digital signature and the intermediate digital signature forming a signature pair, thereby increasing a total number of signature pairs in the packet by one and thereafter transmitting the packet to a subsequent network.

2. The method of claim 1 wherein the source digital signature and the recipient digital signature are any non-repudiable markings.

3. The method of claim 1 wherein a plurality of packets are received from the second network, and if the plurality of packets contain spam levels exceeding a predetermined threshold, the second network compensates the first network.

4. The method of claim 3, wherein the first network only has to sign spam quality of service or compensation agreements with immediate network peers of the first network.

5. The method of claim 3 wherein the first network only seeks compensation from immediate network peers of the first network.

6. The method of claim 1 wherein, in the instance that the packet comprises a digital signature pair, a route taken by the packet can be traced in spite of the presence of one or more of the following: malicious routers, untrusted routers, networks, or other forms of participants.

7. The method of claim 1 wherein packets not destined for the peer-to-peer low-spam overlay are routed in a conventional manner.

8. The method of claim 1 wherein the router at step b) elects not to verify a signature provided by the second network.

9. The method of claim 1 wherein the packet contains a digital signature computed over an originally transmitted packet.

* * * * *